(12) United States Patent
Cerea

(10) Patent No.: US 7,877,896 B2
(45) Date of Patent: Feb. 1, 2011

(54) SYSTEM FOR MAKING PLANTS FOR DRYING SOLID ORGANIC SUBSTANCES IN AQUEOUS PHASE CAPABLE OF CAUSING EXPLOSIVE REACTIONS SAFE AND PROCESS FOR DRYING SAID SUBSTANCES

(75) Inventor: Guiseppina Cerea, Rozzano (IT)

(73) Assignee: Geoline S.R.L., Rozzano (Milano) (IT)

( * ) Notice: Subject to any disclaimer, the term of this patent is extended or adjusted under 35 U.S.C. 154(b) by 483 days.

(21) Appl. No.: 11/862,454

(22) Filed: Sep. 27, 2007

(65) Prior Publication Data

US 2009/0113754 A1 May 7, 2009

(30) Foreign Application Priority Data

Sep. 27, 2006 (IT) .......................... MI2006A1846

(51) Int. Cl.
*F26B 5/08* (2006.01)
*F26B 3/00* (2006.01)

(52) U.S. Cl. .............................. 34/312; 34/315; 34/497; 34/499

(58) Field of Classification Search .................... 34/312, 34/314, 315, 493, 497, 499, 503, 504, 58, 34/130, 132, 595
See application file for complete search history.

(56) References Cited

U.S. PATENT DOCUMENTS

| | | | |
|---|---|---|---|
| 3,425,135 A | 2/1969 | Langsetmo et al. | |
| 2005/0000108 A1 | 1/2005 | Ragnarsson | |

FOREIGN PATENT DOCUMENTS

| | | |
|---|---|---|
| DE | 548729 | 4/1932 |
| DE | 2654043 A1 | 6/1978 |
| DE | 9311698 | 6/1994 |
| DE | 4332799 A1 | 3/1995 |
| DE | 10224173 A1 | 12/2003 |
| EP | 0707858 A1 | 4/1996 |
| EP | 0796832 A1 | 9/1997 |
| EP | 0835679 A1 | 4/1998 |
| EP | 0947540 A2 | 10/1999 |
| EP | 1683420 A2 | 7/2006 |
| GB | 08541 | 11/1909 |
| WO | 2004079282 A1 | 9/2004 |

*Primary Examiner*—Jiping Lu
(74) *Attorney, Agent, or Firm*—Lucas & Mercanti, LLP

(57) ABSTRACT

The present invention refers to a process for drying solid organic substances in aqueous phase including the steps of:
  feeding a continuous flow of such organic substances having a water content=50% by weight into a turbodrier having a cylindrical tubular body with horizontal axis, equipped with inlet and outlet openings, a heating jacket for bring the inner wall of the tubular body to a predetermined temperature, a bladed rotor extending inside the cylindrical tubular body (1) where it is made to rotate at speeds between 15 and 40 m/s, so as to disperse the continuous flow of organic substances into a flow of particles of organic substances;
  centrifuging the particles of organic substances against the inner wall of the turbodrier heated to a temperature above 130° C., with formation of a thin, dynamic, highly turbulent tubular fluid layer, which advances substantially in contact with the inner wall of the turbodrier towards the outlet opening;
  continuously discharging, from the turbodrier, a flow of organic substances in disgregated wet solid form having a water content=45% by weight;
  continuously feeding the flow of disgregated wet solid into an drier operating at a temperature lower than or equal to 160° C.;
  continuously discharging a flow of dry product having a water content=20% by weight from the drier.

28 Claims, 1 Drawing Sheet

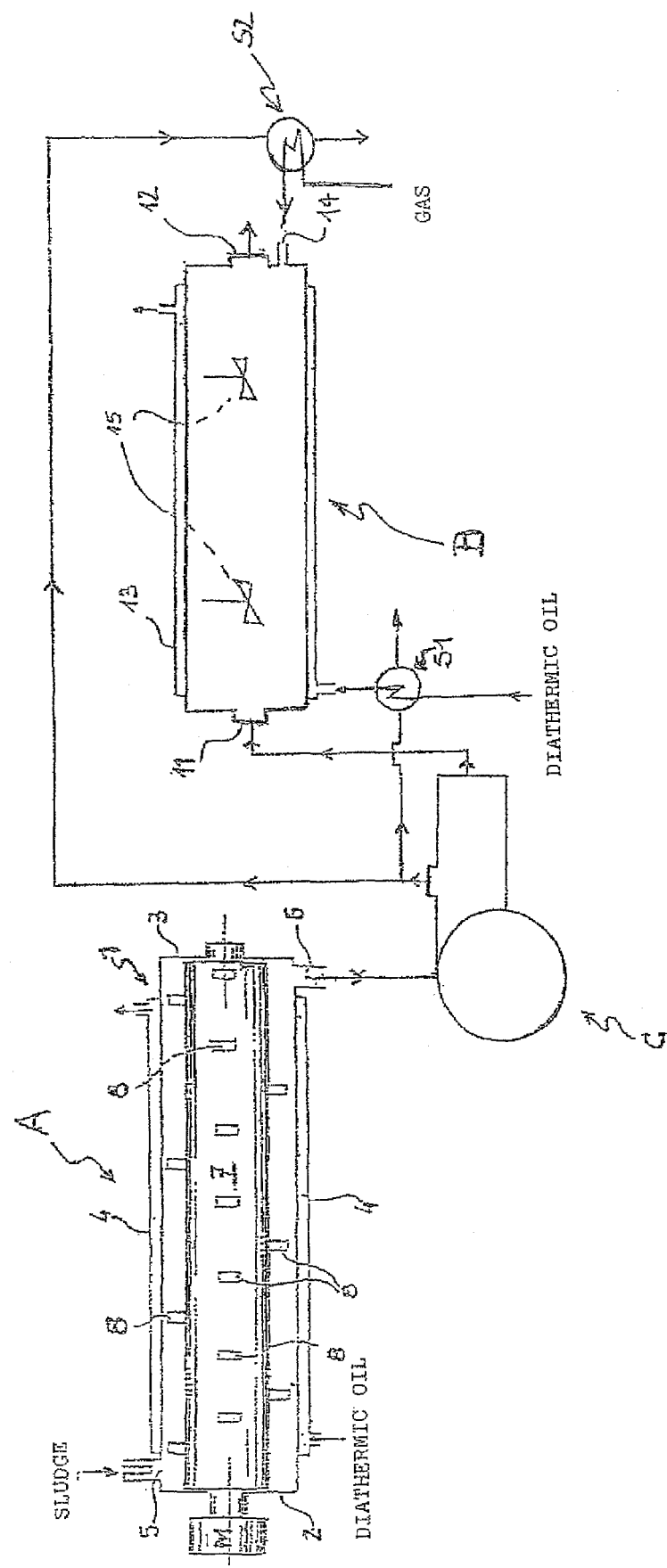

SYSTEM FOR MAKING PLANTS FOR DRYING SOLID ORGANIC SUBSTANCES IN AQUEOUS PHASE CAPABLE OF CAUSING EXPLOSIVE REACTIONS SAFE AND PROCESS FOR DRYING SAID SUBSTANCES

FIELD OF THE INVENTION

The present invention concerns the technical field of land reclamation and in particular refers to a process for drying solid organic substances in aqueous phase capable of causing explosive reactions, such as residual sludge from purification processes.

More specifically the invention concerns a process of the aforementioned type, which allows such organic substances to be dried in conditions such as to avoid triggering explosive reactions from the finely divided organic powders obtained through drying

BACKGROUND OF THE INVENTION

The processes currently used to dry solid organic substances in aqueous phase, such as sludge coming from purification processes, generally foresee a treatment in which inert gases like nitrogen or carbon dioxide are used.

Such inert gases can be used both during the course of the actual thermal drying treatment to which the organic substances are subjected and during the course of the transportation or storage in the purification plant.

The use of inert gases drastically decreases the concentration of oxygen in the atmosphere in contact with the organic substances to be dried making an inert atmosphere that avoids risks of explosion.

Processes of this type are described, for example, in patent EP 0 491 247 and in patent FR 2 847 030.

Although they are advantageous and achieve their purpose, these solutions are not without drawbacks such as rather high costs for making and managing the drying plant, due to the high cost of inert gases and the energy consumption due to their use in the drying process.

SUMMARY OF THE INVENTION

An object of the present invention is to provide an alternative process to the processes provided by the prior art for drying solid organic substances in aqueous phase that eliminates all risk of explosion, in particular a process that achieves a high degree of drying providing a product with a fraction of dry substance of above 80% by weight.

A further object of the present invention is to provide a process of the aforementioned type that is particularly simple and economically advantageous, which therefore involves lower costs for making and managing the relative drying plant than those of the known processes cited above.

These objects are achieved, according to the invention, by a process for drying solid organic substances in aqueous phase such as residual sludge from purification processes, which comprises the steps of:

feeding a continuous flow of said organic substances having a water content greater than or equal to 50% by weight into a turbodrier comprising a cylindrical tubular body with horizontal axis, equipped with inlet and outlet openings, a heating jacket for bring the inner wall of the tubular body to a predetermined temperature, a bladed rotor extending inside the cylindrical tubular body where it is made to rotate at speeds between 15 and 40 m/s, so as to disperse said continuous flow of organic substances into a flow of particles of organic substances;

- centrifuging said particles of organic substances against the inner wall of the turbodrier heated to a temperature above 130° C., with formation of a thin, dynamic, highly turbulent tubular fluid layer, which advances substantially in contact with said inner wall of the turbodrier towards said outlet opening,
- continuously discharging, from said turbodrier, a flow of organic substances in disgregated wet solid form having a water content of no more than 45% by weight, preferably between 20 and 40% by weight;
- continuously feeding said flow of disgregated wet solid into a drier operating at a temperature lower than or equal to 160° C.;
- continuously discharging, from said drier, a flow of dry product having a water content of no more than 20% by weight.

Preferably, the residence time of said organic substances fed into the aforementioned drier as disgregated wet solid, is greater than the residence time of said solid organic substances in aqueous phase fed into said turbodrier.

In accordance with the invention there is therefore a first rapid drying step, carried out in a time range comprised between about 20 seconds and 5 minutes, at a first predetermined temperature (T>130° C.), preferably between 160 and 300° C., in which the risk of explosion is averted thanks to the still high amount of water present in the flow of organic solid substances (up to 45% by weight), followed by a slow drying step comprised between 5 minutes and 1 hour carried out at a second predetermined temperature (T=160° C.), preferably between 80 and 160° C., in which the risk of explosion is averted by the low temperature.

The threshold of about 130-160° C. (depending upon the composition of the sludge) in fact represents a critical temperature since at higher temperatures the finely divided dried organic powders formed thanks to the drying are located in the flammability range and therefore are capable of causing explosive reactions.

Preferably, a flow of gas possibly mixed with steam, for example air, heated to a temperature of 130-250° C., and preferably fed in equicurrent to the flow of sludge is also fed into the turbodrier, whereas into the drier a flow of gas is fed, which is again air or else a different gas, heated to temperatures between 50 and 160° C. preferably in countercurrent to the flow of sludge.

The flow rate of gas fed to the drier is preferably comprised between 2% and 20% of the flow rate of gas fed to the turbodrier, which in turn is preferably comprised between 1000 and 40000 Nm3/h.

Advantageously, in the process according to the invention, the heat necessary to heat the drier and/or the flow of gas fed into it, is heat recovered from the turbodrier.

Preferably, the latent heat of the steam generated inside the turbodrier thanks to the drying of the sludge is recovered, through at least one heat exchanger into which the steam generated by the drying is sent.

Alternatively, the aforementioned heat can be recovered from other energy wastage like hot process water, exhaust fumes and similar.

The aforementioned recovered heat used to heat the drier is used, for example, in the case of a drier equipped with a heating racket to heat such a jacket through hot water or steam or as preferred through diathermic oil.

Preferably, the aforementioned heat is recovered through a pair of heat exchangers arranged in parallel to one another for directly heating the drier, in other words for example the heating jacket, and to heat the flow of process gas fed into it preferably in countercurrent.

Advantageously, furthermore, the drier in which the aforementioned slow drying step takes place can be any heated mixer like, for example, a closet U-shaped cylinder or tube, equipped with mixing means with rotary or alternating motion.

Therefore, the aforementioned agitation/mixing means are selected from the group comprising Archimedean screws, agitators provided with pistons, partitions, blades, paddles, reels, cylinders, drum and ploughshares.

In any case, preferably, the agitation of the flow of disgregated wet solid is a slow agitation, carried out at low speed, for example a speed between 0.1 and 5 m/s, which advantageously does not bring about the risk of generating a spark.

It is also possible to carry out such a slow drying step in a rotary drier of the type comprising a rotary cylindrical body, possibly equipped on the inside with mixing deflectors, as well as in a fluid bed drier.

In another aspect thereof, the present invention refers to a plant for carrying out the process illustrated above, which comprises a turbodrier of the type described above and an drier arranged downstream of the turbodrier that is also of the type described above.

Preferably, the aforementioned plant further comprises at least one heat exchanger arranged between said turbodrier and said drier, for recovering the heat energy (latent heat of the steam generated inside the turbodrier) to be used in the process according to the invention, in particular to supply heat to be used in the slow drying step.

More preferably, there are two heat exchangers arranged in parallel to one another for the recovery of the aforementioned heat which, in particular for exchangers of the type comprising a heating jacket, is used for heating said jacket and a flow of gas fed inside the exchanger to increase its evaporation capacity.

It should be noted that, advantageously, the present process is particularly effective providing a dry end product with a humidity content lower than 20%, without the risk of explosive reactions.

In any case, by acting on the operating variables of the process according to the invention, in particular on the operating conditions of the drier in which the slow drying step takes place, it is also possible to obtain an end product with a humidity content of no more than 5% by weight, still operating safety.

A further advantage of the process according to the present invention is the fact that the aforementioned slow drying step does not involve a significant extra cost compared to known processes in which drying takes place in a single step.

The aforementioned energy recovery can actually even be sufficient to supply the entire heat used in the slow drying, which can consequently be carried out at zero cost.

Moreover, in the rapid drying step, the evaporation capacity of the turbodrier is increased compared to a process with a single step, since the amount of water that must be removed in this step is reduced, with a consequent further energy saving.

Also considering that for some applications it is not necessary to obtain an end product with a fraction of dry substance equal to or greater than 80% by weight, but it is sufficient to have a product with a much lower dry fraction (equal to about 70%), the present process proves to be even more advantageous compared to processes with a single drying step provided by the prior art.

It is possible, in fact, so as to have a product of the aforementioned type, to take the flow of disgregated wet solid coming out from the turbodrier as end product simply bypassing the drier in which the slow drying step takes place, in this way keeping the values of the operating variables substantially unchanged rather than modifying them as would be necessary in a process with a single drying step.

Basically, the process according to the present invention, for the same capacity, allows an energy saving that translates into a cost about 10% less than known processes for drying sludge, ensuring greater safety of operation also for drying that leads to a product with a degree of dry substance of 80% by weight and above, at the same time being particularly flexible in terms of the process fluids, the times and the drying temperatures.

Further advantages and characteristics of this invention shall become clearer from the description of an example of a process according to the invention, made hereafter with reference to the attached drawing, provided for illustrating and not limiting purposes.

BRIEF DESCRIPTION OF THE DRAWINGS

FIG. 1 schematically represents some details of a plant for drying solid organic substances in aqueous phase, in particular residual sludge from purification processes, according to the process of the invention.

DETAILED DESCRIPTION

With reference to FIG. 1, the turbodrier A essentially consists of a cylindrical tubular body 1, closet at the opposite ends by base plates 2, 3 and coaxially equipped with a heating jacket 4 intended to be crossed by a fluid, for example diathermic oil, to keep the inner wall of the body 1 at a predetermined temperature.

The tubular body 1 is equipped with an inlet opening 5 from which the solid organic substances in aqueous phase (sludge) are continuously fed and with an outlet opening 6 from which a flow of organic substances in disgregated wet solid form is discharged.

In order to feed the flow of organic solid substance in aqueous phase, the aforementioned inlet opening 5 is equipped with a high-speed Archimedean screw feeder or volumetric feeder, not represented in the FIGURE.

For contingent technical reasons the turbodrier A can of course have more than one inlet and/or outlet opening.

Inside the tubular body 1 a rotary bladed rotor 7 extends, the paddles 8 of which are arranged helically and are orientated to centrifuge and simultaneously convey towards the outlet opening 6 the sludge subjected to drying treatment.

The bladed rotor 7, as known, can be supported by suitable means housed within the tubular body 1, or else support means can be foreseen outside of the tubular body 1, without for this reason departing from the scope of protection of the present invention.

A motor M is foreseen for actuating the bladed rotor 7 at variable peripheral speeds from 15 to 40 meters per second.

A flow of organic substances in aqueous phase with humidity content of above 50% by weight is fed continuously into the turbodrier A through the inlet opening 5. The sludge is centrifuged by the paddles 8 of the rotor 7, upon its entry into the turbodrier A, against the heated inner wall and is simultaneously conveyed towards the outlet opening 6 thanks to the orientation of the aforementioned paddles 8.

When the water contained in the sludge, through the effect of the centrifuging action exerted by the paddles 8 of the rotor 7, comes into contact with the wall of the tubular body 1 heated to a high temperature, it evaporates instantly.

Moreover, part of the water bound to the particles of sludge, thanks to the high heat energy yielded by the heated wall of the tubular body 1 and the high kinetic energy imparted by the paddles 8 of the rotor, is also taken away in the form of steam from the solid particles of organic substance.

The evaporation capacity of the turbodrier A is also further increased in the case in which it is foreseen to feed a flow of heated gas as described previously inside of it.

Such a flow of gas, for example air possibly mixed with steam, is fed into the turbodrier A preferably in equicurrent to the flow of sludge to be dried at a temperature preferably between 130 and 250° C.

Coming out from the turbodrier A, after a residence time comprised from 20 seconds to 5 minutes, a continuous flow of organic substance in disgregated wet solid form with a water content of no more than 45% by weight is therefore obtained.

Such an organic flow of disgregated wet solid is then fed continuously into the drier B, having inlet and outlet openings 11, 12 respectively, and the inner wall of which is heated to a temperature lower than or equal to 160° C.

The flow of organic substance in disgregated wet solid form remains in the drier B for a time period comprised between 5 minutes and one hour, depending upon the desired degree of dryness for the end product (80% by weight and above of dry fraction) and the temperature of its inner wall.

A slow drying step is carried out in such a drier B, with slow agitation of the flow of sludge supplied by dedicated mixing/agitation means indicated with 15, preferably agitation at a speed between 0.1 and 5 m/s.

Preferably, the drying takes place by also feeling a flow of hot air at a temperature comprised between 50 and 160° C. to the drier B.

In accordance with a preferred aspect of the invention such a flow of hot air is fed in countercurrent to the drier B.

The aforementioned flow of hot air is advantageously heated by recovering the heat of the steam generated, following the drying of the sludge, inside the turbodrier A or else, as described previously, by recovering the heat of other energy wastage generated.

With regard to the aforementioned steam it should be stated that it can be separated from the flow of disgregated wet solid through, for example, a conventional separation apparatus arranged between the turbodrier A and the drier B, such as a cyclone possibly combined with a bag filter, in the FIGURE globally represented with C.

Otherwise, the steam generated in the drying of the sludge can be discharged from the turbodrier A through outlet openings different to that for discharging the flow of disgregated wet solid, with which the turbodrier A can be equipped in an alternative aspect of the invention.

The recovered steam is then sent to two heat exchangers arranged in parallel, respectively indicated with S1 and S2, to obtain the heating of the process fluids used to carry out the present process.

In detail in the aforementioned way, through the exchanger S1 heat is recovered to heat up a flow of diathermic oil that in turn heats up the inner wall of the drier B through a respective heating jacket 13; whereas through the exchanger S2 heat is recovered to heat up the flow of hot air fed to the drier B.

To feed such a flow of hot air the drier B is equipped with a second inlet opening indicated with 14.

Without wishing to limit the scope of the present invention the following example illustrates in what way the present invention can be actuated and used.

In particular, in the example shown below specific reference is made to a flow of residual sludge from a purification process, dried in a process with double drying step, respectively fast in a turbodrier and slow in an drier like a heated mixer of the type using blades, but it must be understood that other solid organic substances in aqueous phase capable of triggering explosive reactions and other conventional driers, like for example rotary driers or fluid bed driers, can be used in the process according to the present invention.

Example

In a turbodrier A made from special stainless steel AISI 304 of the type schematically described above, in which the bladed rotor is made to rotate at a peripheral speed of about 35 m/s and in which the inner wall is kept at 240° C., a continuous flow of a residual sludge from a purification process of sewage, having a water content equal to 80% by weight, is fed with a flow rate of 1000 kg/hour through the inlet opening of the turbodrier.

Immediately at the inlet of the turbodrier A, the flow of sludge is mechanically dispersed into minute particles, which are immediately centrifuged against the inner wall of the turbodrier, where they form a dynamic thin tubular layer.

After a residence time of about 2 minutes in the turbodrier A, from the outlet opening thereof 285 kg of sludge is discharged in disgregated wet solid form at a temperature of 80° C. and having a humidity content of 30% by weight, which is fed continuously into the drier B, in particular a drier of the type using blades the inner wall of which is heated to a temperature of 100° C.

Such a flow of disgregated wet solid sent to the drier B is fed in countercurrent to a flow of hot air fed into the drier B with a flow rate equal to 200 Nm3/h and having a temperature of 90° C.

The speed of rotation of the drier B is 0.47 meters per second, whereas the residence time inside it of the flow of disgregated wet solid fed into it is 20 minutes.

Coming out from the drier B 220 kg of a dry organic product having a humidity content equal to 10% by weight and therefore having a dry fraction corresponding to 90% by weight are obtained.

Basically, the present invention makes it possible to make safe plants in which drying processes of solid organic substances in aqueous phase capable of causing explosive reactions, through a first rapid drying step, carried out at a preferably high temperature and during which the flow of substance to be dried is subjected to vigorous agitation, followed by a slow drying step, carried out at a preferably lower temperature and in which the flow of substance to be dried is subjected to slow mixing.

The invention claimed is:

1. A process for drying solid organic substances in aqueous phase which comprises the steps of:
feeding a continuous flow of said organic substances having a water content greater than or equal to 50% by weight into a turbodrier comprising a cylindrical tubular body with horizontal axis, equipped with inlet and outlet openings, a heating jacket for bring the inner wall of the tubular body to a predetermined temperature, a bladed rotor extending inside the cylindrical tubular body where it is made to rotate at speeds between 15 and 40 m/s, so as to disperse said continuous flow of organic substances into a flow of particles of organic substances;
centrifuging said particles of organic substances against the inner wall of the turbodrier heated to a temperature above 130° C., with formation of a thin, dynamic, highly turbulent tubular fluid layer, which advances substantially in contact with said inner wall of the turbodrier towards said outlet opening;

continuously discharging a flow of organic substances in disgregated wet solid form having a water content of no more than 45% by weight from said turbodrier;

continuously feeding said flow of disgregated wet solid into a drier operating at a temperature lower than or equal to 160° C. and mixing said flow of disgregated wet solid at a slow speed, such that the risk of generating sparks is prevented;

continuously discharging a flow of dry product having a water content of no more than 20% by weight from said drier;

wherein the residence time of said organic substances fed into said drier as disgregated wet solid is greater than the residence time of said solid organic substances in aqueous phase fed into said turbodrier.

2. The process according to claim 1, wherein the residence time of said flow of solid organic substances in aqueous phase into said turbodrier is between 20 seconds and 5 minutes.

3. The process according to claim 1, wherein the residence time of said flow of organic substances in disgregated wet solid form into said drier is between 5 minutes and 1 hour.

4. The process according to any one of the claims 2 or 3, wherein the inner wall of said turbodrier is heated to a temperature of between 160 and 300° C.

5. The process according to claim 1, wherein the inner wall of said turbodrier is heated to a temperature of between 160 and 300° C.

6. The process according to any one of claims 2-5, wherein said drier operates at a temperature of between 80 and 160° C.

7. The process according to claim 1, wherein said drier operates at a temperature of between 80 and 160° C.

8. The process according to any one of claims 2-5 or 7, wherein in said drier the flow of organic substances in disgregated wet solid form is subjected to mixing at a speed of between 0.1 and 5 meters per second.

9. The process according to claim 1, wherein in said drier the flow of organic substances in disgregated wet solid form is subjected to mixing at a speed of between 0.1 and 5 meters per second.

10. The process according to any one of claims 2-5, 7 or 9, wherein a flow of gas heated to a temperature of 130-250° C. is also fed into said turbodrier.

11. The process according to claim 10, wherein said flow of gas is fed in equicurrent to said flow of sludge.

12. The process according to claim 1, wherein a flow of gas heated to a temperature of 130-250° C. is also fed into said turbodrier.

13. The process according to claim 12, wherein said flow of gas is fed in equicurrent to said flow of sludge.

14. The process according to claim 12, wherein said flow of gas is a flow of air possibly mixed with steam with a flow rate of between 1000 and 40000 Nm3/h.

15. The process according to claim 14, wherein said flow of gas is a flow of air with a flow rate of between 2% and 20% of the flow rate of gas fed to said turbodrier.

16. The process according to claim 15, wherein said flow of gas is heated recovering the latent heat of the steam generated inside said turbodrier, or the heat of other energy wastage.

17. The process according to claim 16, wherein said other energy wastage comprises hot water and exhaust fumes.

18. The process according to any one of claims 2-5, 7, 9, 12, 13 or 14, wherein a flow of gas heated to a temperature of between 50 and 160° C. is also fed into said drier.

19. The process according to claim 18, wherein said flow of gas is fed in countercurrent to said flow of disgregated wet solid.

20. The process according to claim 18, wherein said flow of gas is a flow of air with a flow rate of between 2% and 20% of the flow rate of gas fed to said turbodrier.

21. The process according to claim 1, wherein a flow of gas heated to a temperature of between 50 and 160° C. is also fed into said drier.

22. The process according to claim 21, wherein said flow of gas is fed in countercurrent to said flow of disgregated wet solid.

23. The process according to claim 21, wherein said flow of gas is heated recovering the latent heat of the steam generated inside said turbodrier, or the heat of other energy wastage.

24. The process according to claim 23, wherein said other energy wastage comprises hot water and exhaust fumes.

25. The process according to any one of claims 1, 2-5, 7, 9, 12, 14, 21, 22, 15, 16 or 23, wherein said drier is heated recovering the latent heat of the steam generated inside said turbodrier, or the heat of other energy wastage.

26. The process according to claim 25, wherein said other energy wastage comprises hot water and exhaust fumes.

27. The process according to claim 1, wherein said organic substances in aqueous phase comprise a residual sludge from purification processes.

28. The process according to claim 1, wherein said flow of organic substances in disgregated wet solid form have a water content of between 20 and 40% by weight.

\* \* \* \* \*